Aug. 5, 1924.                        1,504,168
C. H. VIEBROCK ET AL
GRAIN BIN
Filed Aug. 12, 1922          3 Sheets-Sheet 1
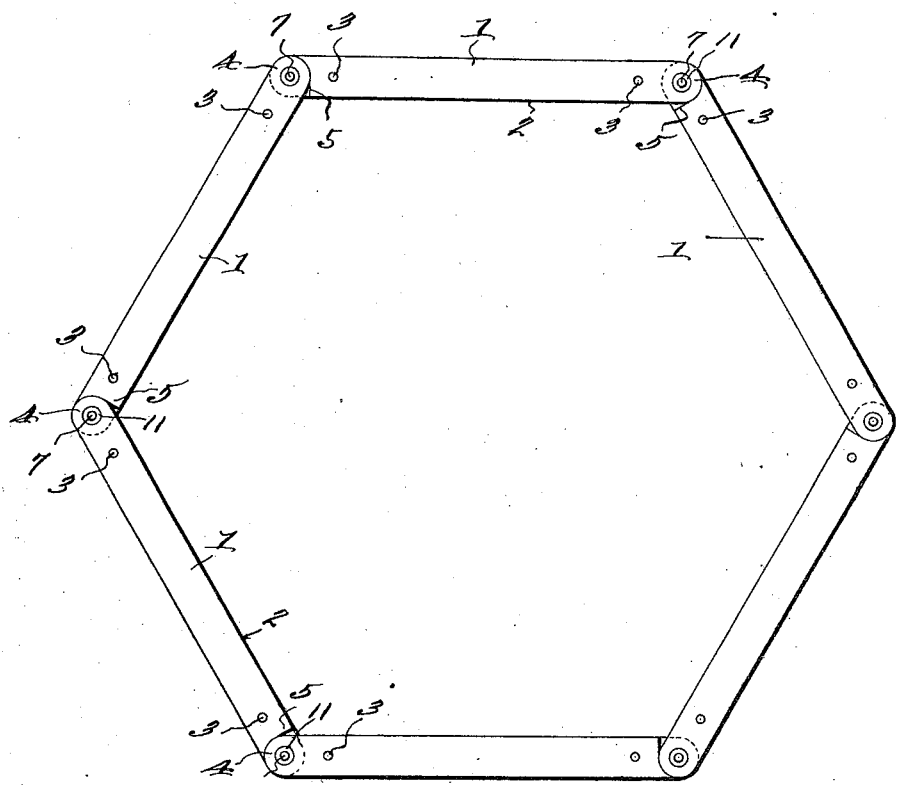

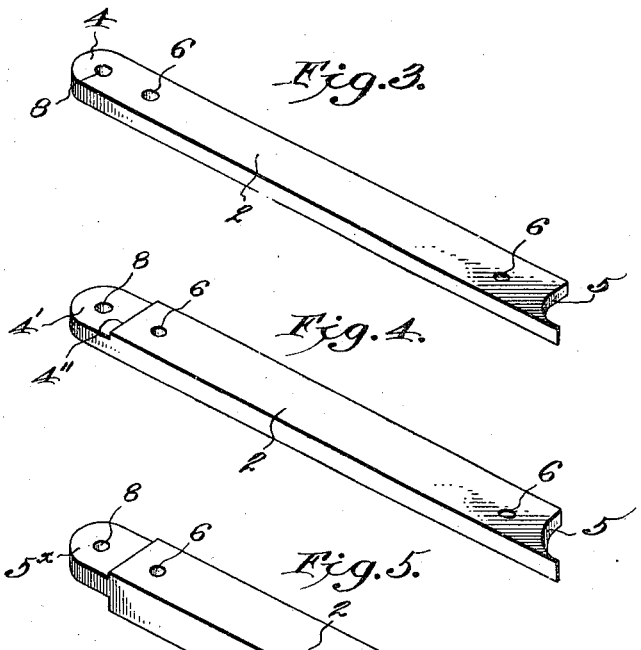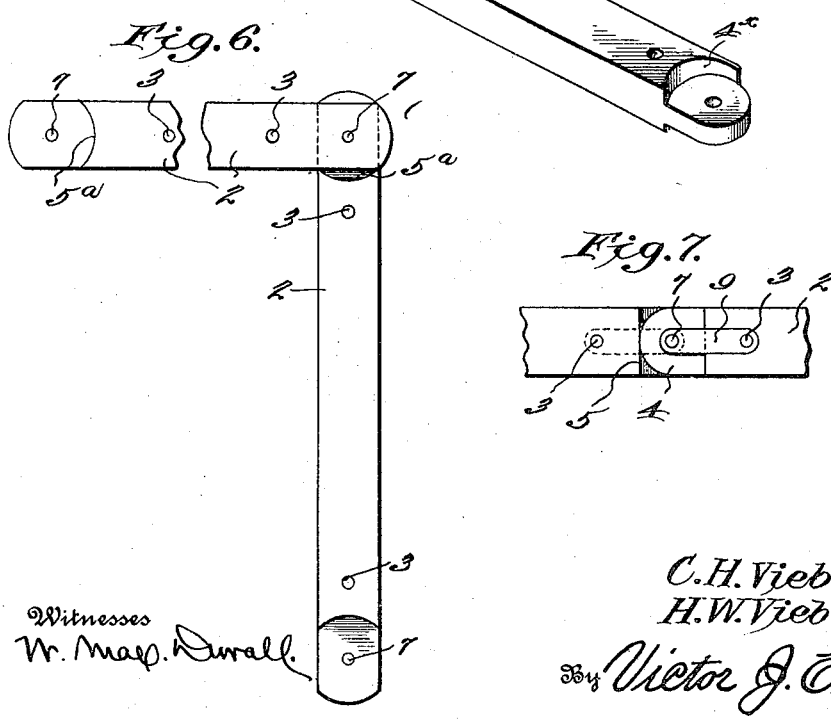

Aug. 5, 1924.
C. H. VIEBROCK ET AL
1,504,168
GRAIN BIN
Filed Aug. 12, 1922  3 Sheets-Sheet 3
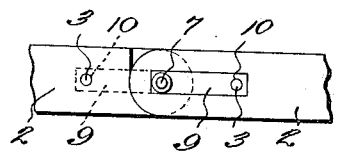
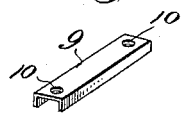
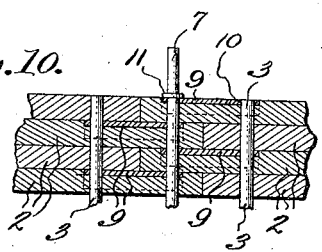
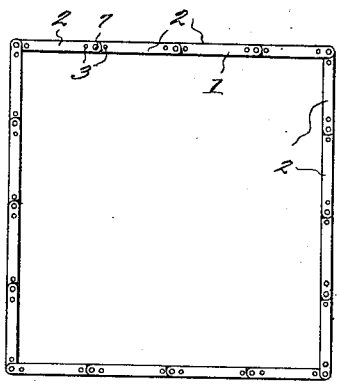
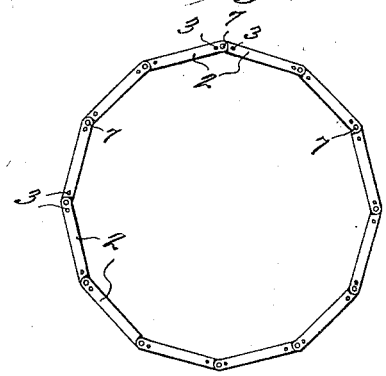
Witnesses
M. May. Duvall
Inventors
C. H. Viebrock
H. W. Viebrock
By Victor J. Evans
Attorney Patented Aug. 5, 1924.

1,504,168

UNITED STATES PATENT OFFICE.

CARL H. VIEBROCK AND HENRY W. VIEBROCK, OF DOUGLAS, WASHINGTON.

GRAIN BIN.

Application filed August 12, 1922. Serial No. 581,547.

*To all whom it may concern:*

Be it known that we, CARL H. VIEBROCK and HENRY W. VIEBROCK, citizens of the United States, residing at Douglas, in the county of Douglas and State of Washington, have invented new and useful Improvements in Grain Bins, of which the following is a specification.

This invention relates to a bin for holding grain and the like, the general object of the invention being to construct the bin of hinged members which are so arranged that the bin can be made to assume any one of a number of shapes.

Another object of the invention is to provide means for making the joints between the members tight so as to prevent the leakage of grain at these joints.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a plan view of a bin constructed in accordance with this invention.

Figure 2 is an elevation of the bin shown in Figure 1.

Figure 3 is a view of one of the elements of the section.

Figure 4 is a view of a modified form of element.

Figure 5 is a view of another form of element.

Figure 6 shows another modification and shows how the elements are placed together to form a corner of the bin.

Figure 7 is a view of a section constructed of the elements shown in Figure 4 and showing the use of brace irons.

Figure 8 is a fragmentary plan view showing the use of brace irons in another form of the invention.

Figure 9 is a perspective view of one of these brace irons.

Figure 10 is a longitudinal sectional view through Figure 8.

Figure 11 is a plan view showing the parts arranged to form a square bin.

Figure 12 is a similar view showing the parts arranged to form a substantially round bin.

Referring to Figures 1, 2 and 3, A indicates the bin which is composed of a plurality of sections 1 which are hingedly connected together and each section is composed of a plurality of pieces 2 which are connected together to form the section by the tie rods 3. Each piece has one end convex, as shown at 4, and its other end concave with one point cut off, as shown at 5. Each piece is provided with the holes 6 for receiving the tie rods 3. The pieces composing each section are staggered so that the ends 4 project beyond the ends 5. Thus a plurality of hinged parts are formed by these projecting ends and the hinged parts of one section overlap the hinged parts of the other section and the hinged parts are connected together by the rods 7 which pass through holes 8 formed in the ends 4 of the pieces. The curved ends 5 of the pieces of one section will engage the rounded ends 4 of the pieces of the adjacent sections and thus make a grain tight joint no matter in what position the sections are placed to form a bin. Figure 1 shows a bin provided with six sides, though it will be seen that due to the hinged connections of the sections a bin can be constructed of almost any desired shape.

In Figure 4 the convex end 4' is of slightly less thickness than the rest of the piece so as to form a shoulder 4'' which is engaged by a piece of the adjacent section.

We may make the pieces of double thickness, as shown in Figure 5. In this form each end of each piece is formed with a convex part 5$^x$ and a concave part 4$^x$.

Figure 6 shows the pieces as being formed with a concave end 5$^a$, both points of which are made use of instead of having one point cut away as in the other forms. In this form the two points of one piece engage a side of another piece in order to form the corner of a rectangular bin.

We provide iron braces 9 for strengthening the sections and these braces are provided with holes 10 through which the rods 3 and the hinge rods 7 pass. We prefer to make these braces of channel iron as shown. We also prefer to place stops 11 on the rods for holding them in position in the sections with their upper ends projecting from the sections, these projecting ends receiving the next section, thus binding the sections together.

From the foregoing it will be seen that a bin of any desired dimensions can be easily and quickly constructed without the use of special tools and without permanently attaching the parts together. Thus the bin can be easily knocked down when it has served its purpose and the parts stored away. The invention also permits a grain bin to be built of just the size desired and it can be added to as it is being filled. The invention also permits a bin to be constructed of any desired shape so that it can be made to accommodate irregular spaces between buildings or in buildings.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:—

A bin of the class described formed of a plurality of sections which are hingedly connected together, each section being composed of a plurality of pieces connected together in staggered relation, one end of each piece being convex and its other end substantially concave, the convex ends projecting beyond the concave ends to form hinge parts and the concave ends of the pieces of one section engaging the convex ends of the pieces of the adjacent section.

In testimony whereof we affix our signatures.

CARL H. VIEBROCK.
HENRY W. VIEBROCK.